(12) United States Patent
Handke et al.

(10) Patent No.: US 6,343,804 B1
(45) Date of Patent: Feb. 5, 2002

(54) SHOCK ABSORBER STRUT WITH STEERING KNUCKLE

(75) Inventors: Günther Handke, Euerbach; Frank von den Bergen, Heidenfeld, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/641,060

(22) Filed: Aug. 17, 2000

(30) Foreign Application Priority Data

Aug. 18, 1999 (DE) .......................... 199 39 029

(51) Int. Cl.[7] ............................. B60G 15/07; B62D 7/18
(52) U.S. Cl. ...................... 280/124.145; 280/124.154; 280/93.512
(58) Field of Search ................... 280/124.145, 124.146, 280/124.154, 93.512, 86.751, 86.752

(56) References Cited

U.S. PATENT DOCUMENTS

| | | | |
|---|---|---|---|
| 4,321,988 A | * | 3/1982 | Bich |
| 4,441,593 A | * | 4/1984 | Axthammer |
| 4,484,670 A | * | 11/1984 | Axthammer et al. |
| 4,491,339 A | * | 1/1985 | Mizumukai et al. |
| 4,995,633 A | * | 2/1991 | Santo |
| 5,607,035 A | * | 3/1997 | Fulks et al. |
| 6,082,720 A | * | 7/2000 | Ducloux et al. |
| 6,126,198 A | * | 10/2000 | Handke et al. |

FOREIGN PATENT DOCUMENTS

| | | |
|---|---|---|
| DE | 196 17 898 A1 | 11/1997 |
| DE | 198 15 215 A1 | 12/1998 |

* cited by examiner

Primary Examiner—Paul N. Dickson
(74) Attorney, Agent, or Firm—Cohen, Pontani, Lieberman & Pavane

(57) ABSTRACT

A shock absorber strut is provided including a tubular body, a clamping member, a steering knuckle, a fastening member and a positioning member. The tubular body is arranged at a lower region of the strut. The clamping member clamps the steering knuckle to the tubular body and includes a continuous slot along the steering knuckle and a fastening member which fastens the steering knuckle tubular body. The positioning member is a one piece component for positioning the clamping member with respect to the tubular body and includes a stop for positioning in the longitudinal direction and a projection for positioning in a circumferential direction. Optionally, a further positioning connection may be provided including a bead on the positioning member and a corresponding recess in the tubular body which engages the bead and allows the clamping member to be exactly aligned in the circumferential direction. Various welding processes performed on the positioning member and/or the positioning connection provide further strength and support to the strut.

15 Claims, 4 Drawing Sheets

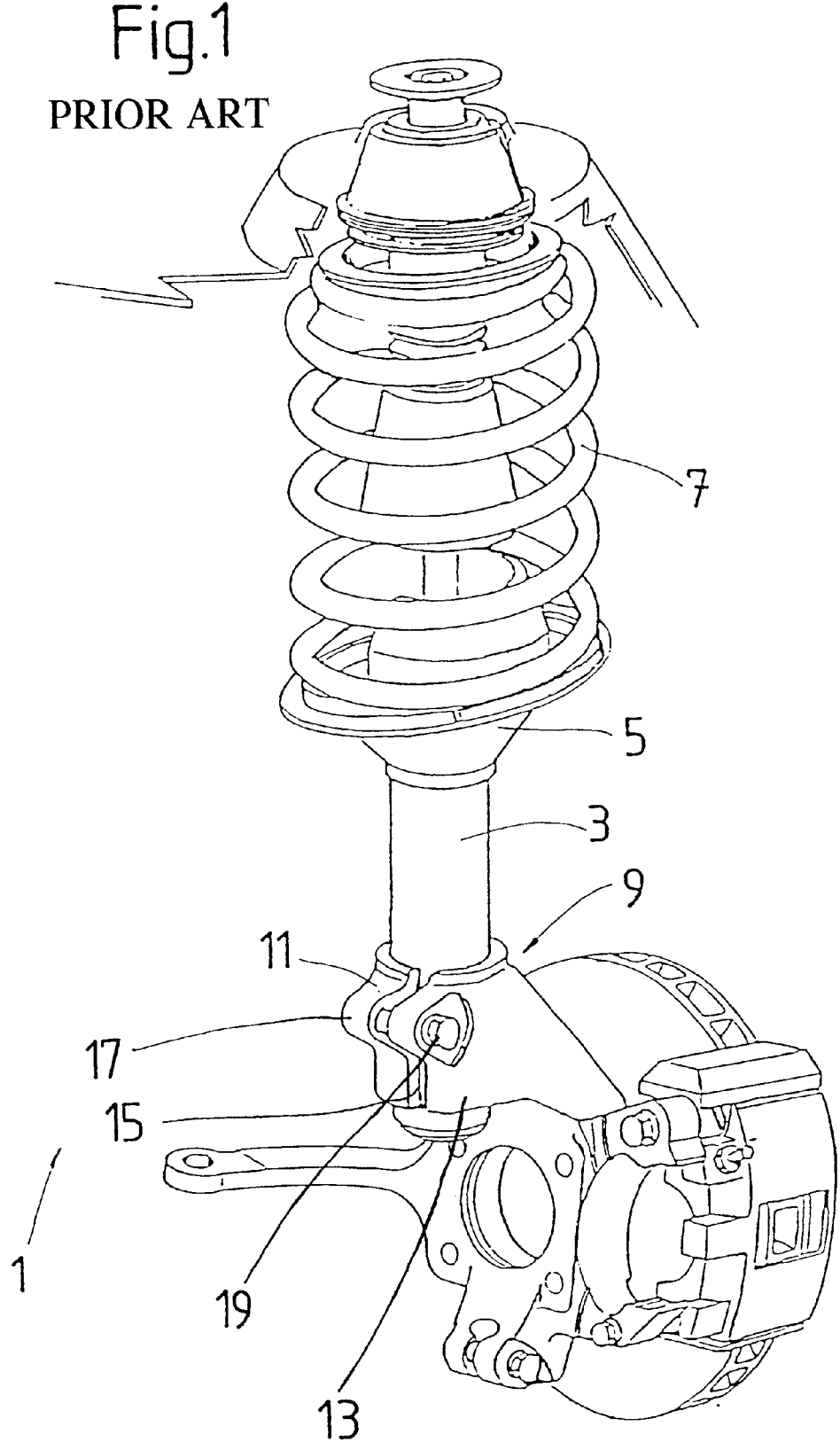

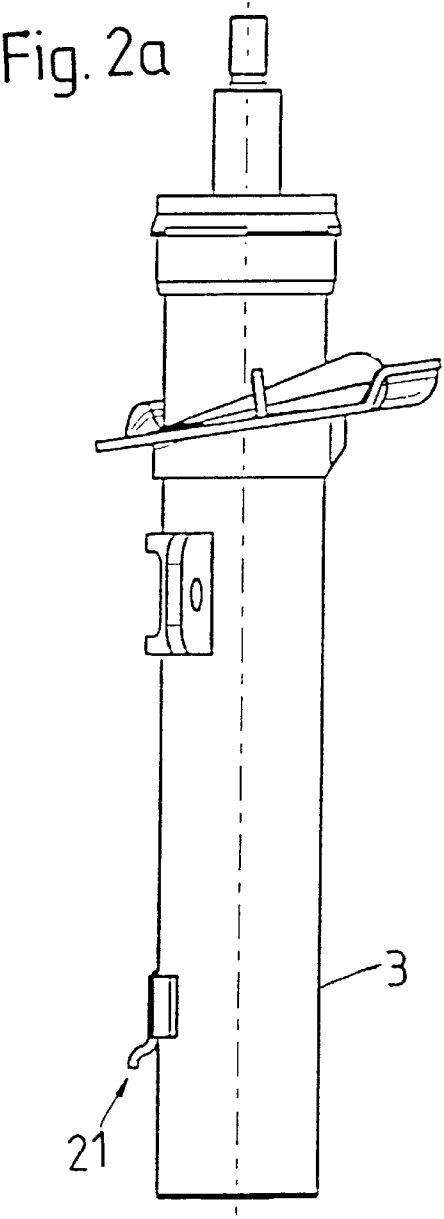
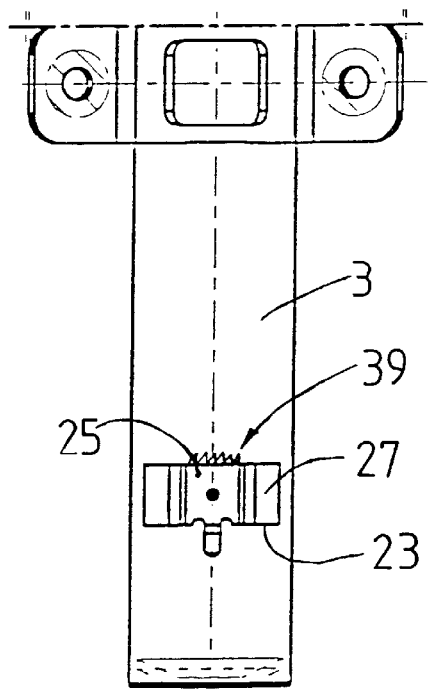

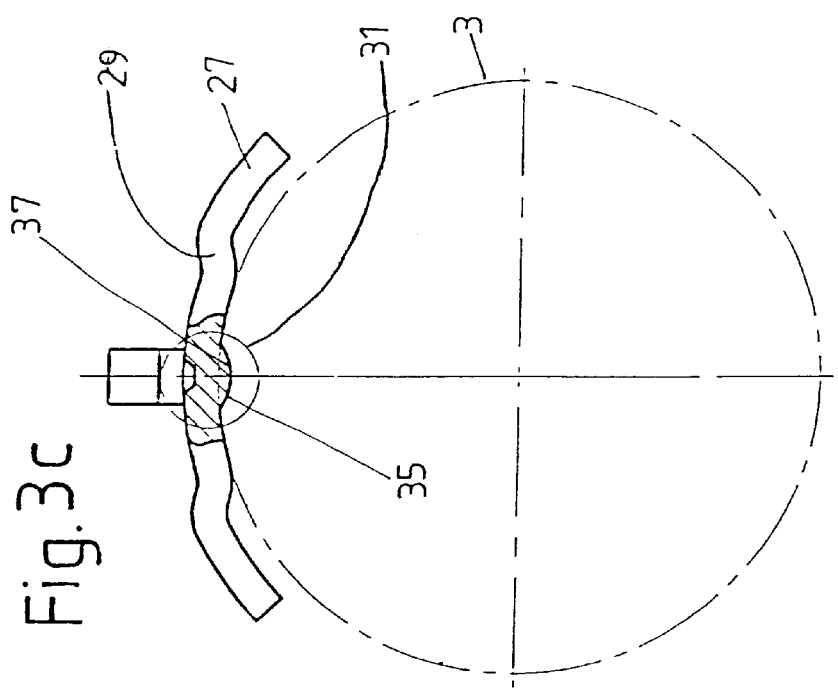
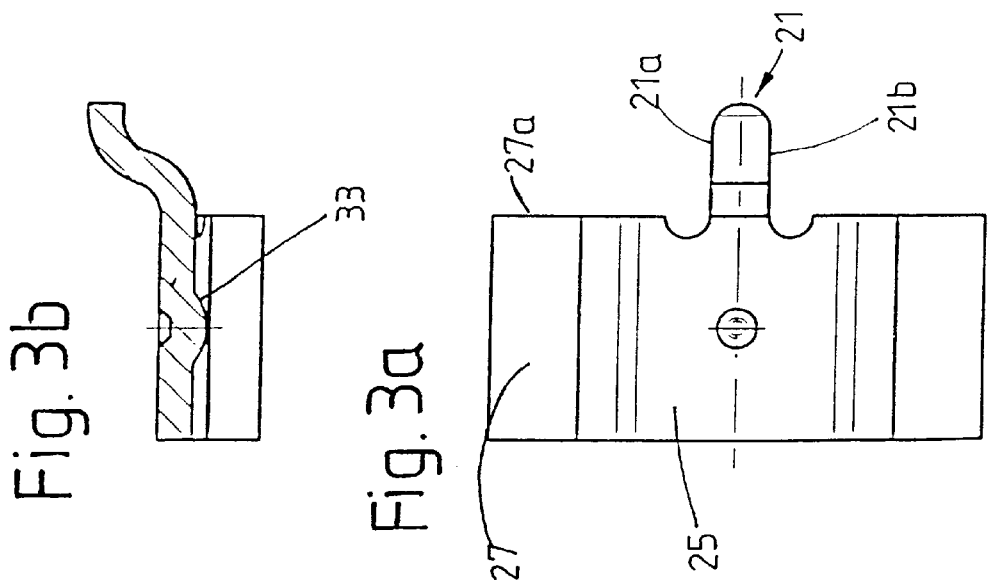

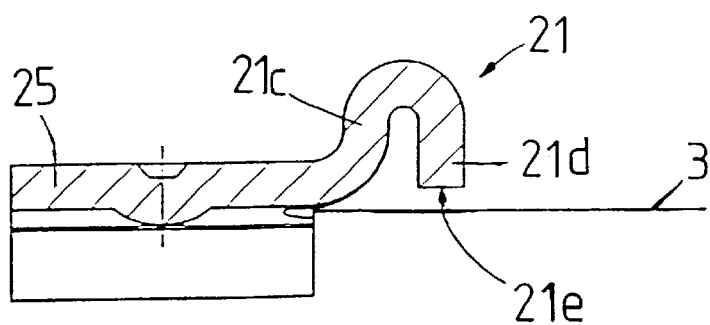
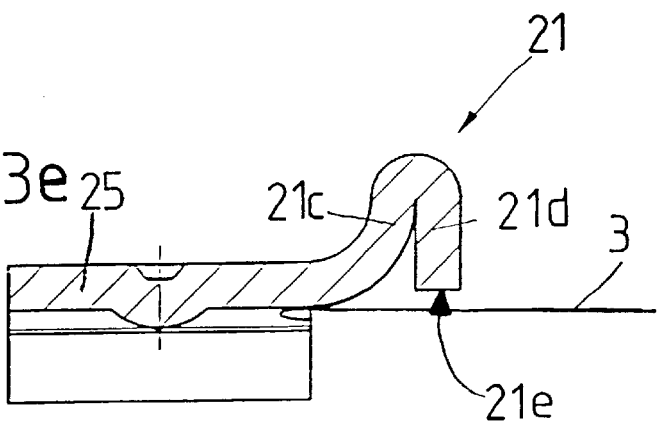
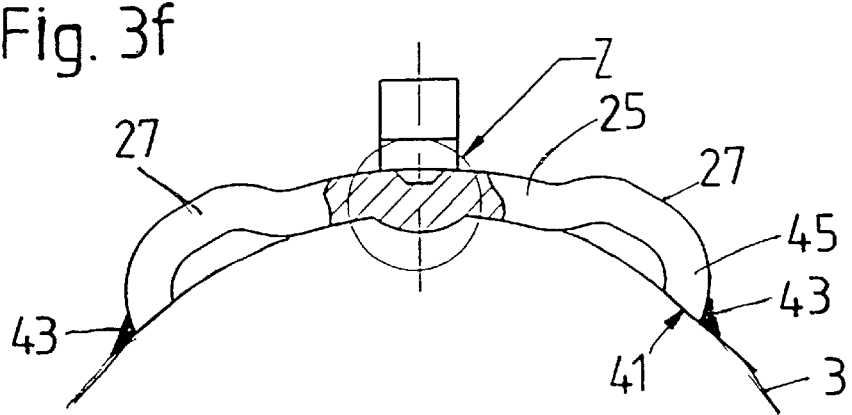

SHOCK ABSORBER STRUT WITH STEERING KNUCKLE

BACKGROUND OF THE INVENTION

1. Field of the Invention

The invention relates to a shock absorber strut with a steering knuckle. More particularly, the present invention is a shock absorber strut in which a steering knuckle forms a reliable connection to the tubular body by a clamping means and a positioning means, where the positioning means includes a projection and a stop.

2. Description of the Related Art

German reference DE 198 15 215 A1 discloses a shock absorber strut with a steering knuckle. The shock absorber strut has a tubular body. A screw connection fastens the steering knuckle to the tubular body. The steering knuckle has a continuous slot which, together with fastening means, forms a clamping connection to the tubular body. A positioning connection having a projection and a recess is between the tubular body and the steering knuckle. The positioning connection makes it possible for the components forming the clamping connection to be perfectly aligned with one another in the circumferential direction. The tubular body has a stop which positions the steering knuckle along the longitudinal axis of the shock absorber strut.

A clamping connection must be reliable so that the steering knuckle cannot come loose under any circumstances. The tightening torque needed to obtain a high clamping force requires clamping screws capable of being subjected to high load. The tubular body is also subjected to considerable load, namely the amount of clamping force or load required to ensure a secure connection.

SUMMARY OF THE INVENTION

The object of the present invention is to produce a shock absorber strut which provides the necessary orientation of a clamping connection of the strut to a load bearing part by fixing the steering knuckle in the axial direction of the shock absorber strut. The object is achieved by a one piece component of a projection of the positioning device and a stop for positioning the steering knuckle along the longitudinal axis of the tubular body.

In the present invention, a projection fastened to the tubular body need only absorb circumferential forces during assembly. However, if the clamping connection of the steering knuckle comes loose while the shock absorber strut is in use, the force of the connection between the projection and the tubular body is then also available for the stop in order to absorb the force of loads in the longitudinal direction.

In a further embodiment, the stop has a middle part which is fastened to the tubular body, and at least one lateral wing extends from the middle part and is designed so as to be at a radial distance from the tubular body. It has proved beneficial if the middle part has two wings, to avoid introducing any torsional forces into the connection between the middle part and the tubular body. Furthermore, a larger bearing surface is available for the steering knuckle.

According to another embodiment, the projection is formed by a tongue which is shaped out of the plane of the middle part. It was found that, when the projection engages into the slot of the steering knuckle at a greater radial distance from the tubular body, higher positioning accuracy is achieved or, conversely, a greater dimensional tolerance in the components used can be permitted.

At the same time, the projection has an S-shaped profile. This embodiment is advantageous in two respects. On the one hand, forming achieves strain hardening which makes it possible for the projection to have a relatively small wall thickness. Furthermore, the outlay in terms of material even for the length of the tongue is more advantageous than that for a simply vertical projection.

For shock absorbers struts subjected to particularly high stress, the projection has a U-shaped profile. The two limbs extending essentially perpendicularly to the longitudinal axis of the shock absorber strut then engage into the slot of the steering knuckle.

In a related embodiment, the projection has a double-layered design essentially at right angles to the longitudinal axis of the tubular body. It is ultimately an axially compressed Uprofile, in which the axial web has been pressed together so that the two vertical webs come to bear or be in contact at least over a region of length.

In the embodiment having the tongue, it has proved advantageous if the end face of the projection is at a distance from the tubular body. No defects can form during the lacquering operation from failure of lacquer to penetrate a gap.

Regarding fastening the structural unit composed of the stop and of the projection, it is advantageous if the middle part is connected for positioning to the tubular body by means of contact welding. Contact welding is resistance welding which is executed in a central region of the middle part, and therefore the edges of the middle part remain available for further fastening possibilities.

It is therefore possible for the middle part to be connected to the tubular body by means of fastening welding in addition to the contact welding. With fastening welding, there is a high degree of flexibility regarding the type of welding method to be used. Even when heat is generated on one side, the middle part cannot separate from the tubular body due to the fastening weld.

In order to simplify the welding apparatus and to increase the contact surface for contact welding, the middle part makes a positive connection with the tubular body. For this purpose, the tubular body has a depression into which a bead of the middle part engages for creating a positive connection.

For shock absorber struts subjected to greater stress, at least one wing may be welded to the tubular body. This embodiment may also be combined with fastening welding of the middle part. A longer weld seam is obtained, which can consequently also transmit higher load.

To allow free choice of the welding method, the wing has a surface of contact with the tubular body. To make the contact surface readily accessible to the welding apparatus, the contact surface is formed on the lateral edge of the wing. It was found to be particularly advantageous if the contact surface is formed by the end face of the lateral edge. The ratio of the outlay in forming relates to the increase in consolidation and is particularly favorable.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be explained in more detail with reference to the drawings of the present invention, illustrated in schematic form as follows:

FIG. 1 is an illustration of the strut when it is installed;

FIGS. 2a and 2b is the tubular body as an individual part; and

FIGS. 3a–3f is the structural unit composed of the projection and the stop shown as an individual part.

DETAILED DESCRIPTION OF THE PRESENTLY PREFERRED EMBODIMENTS

FIG. 1 shows a shock absorber strut 1, such as is used particularly in vehicles of the compact class. The shock absorber strut has a spring plate 5 which, as a rule, is welded to a tubular body 3 and on which a vehicle suspension spring 7 is supported. A steering knuckle 9 is fastened by means of a clamping connection 11 to the lower end of the tubular body 3.

The steering knuckle has a sleeve portion 13 which has a slot 15 essentially parallel to the longitudinal axis of the shock absorber strut. The slot 15 gives the sleeve portion elasticity in the circumferential direction. In the region of the slot, the sleeve portion is provided with a projection 17 having a passage orifice which runs transversely to the longitudinal axis of the shock absorber strut and which comprises a threaded part. A fastening means 19 in the form of a tension screw is screwed in the passage orifice.

FIGS. 2a and 2b illustrate two views of the tubular body as an individual part. Fastened in the lower region of the tubular body 3 is a structural unit which consists of a projection 21 engaging into the slot 15 of the steering knuckle 9 (see FIG. 1) and of a stop 23.

FIG. 3a shows, as an individual part, the structural unit composed of the projection 21 and of the stop 23. The structural unit has a middle part 25, from which wings 27 extend laterally. The actual stop is formed by end faces 27a. As may be inferred from FIG. 3c, the middle part is adapted to the radius of the tubular body. The wings 27 are at a radial distance from the tubular body, so that the end faces come to bear as centrally as possible on the surface of the steering knuckle. Transitions 29, which markedly consolidate the structural unit, are integrally formed between the wings and the middle part.

FIG. 3b shows that the projection 21 is shaped out of the plane of the middle part and has an S-shaped profile. The transitional angles between the individual portions of the projection are greater than 90° in order to markedly reduce deposits of material that occur during manufacture in the region of the curves on the sides 21a; 21b (see FIG. 3a) of the projection. As a result, the width of the slot in the steering knuckle can be used more effectively. Compared to a projection shaped at right angles forming the projection of the present invention can result in saving material.

There are several measures provided for fastening the structural unit composed of the projection and of the stop. A positive connection 31, between the middle part and the tubular body is preferred, for simple positioning of the structural unit on the tubular body. The positive connection is formed by a punctiform bead 33 (FIG. 3b) and a depression 35 in the tubular body (FIG. 3c). In addition, for fastening the structural unit onto the tubular body, contact welding 37, i.e. resistance welding is performed, which achieves reliable positioning.

Next, the middle part 25 is connected to the tubular body 3 via fastening welding 39 (see FIG. 2b). Due to the prior contact welding, the middle part can no longer separate from the tubular body during welding, so that the stops or the wings maintain their intended position.

The embodiments of FIGS. 3d to 3f show modifications of the structural unit which are preferably used for shock absorber struts designed for higher load.

The tongue-shaped projection 21 in FIG. 3d is of U-shaped design. The two parallel webs 21c, 21d of the projection run, as far as possible, at right angles to the longitudinal axis of the shock absorber strut. The end face 21e is aimed at the tubular body 3, but is 1 to 2 mm from the tubular body. The intention is to avoid forming too small a gap between the end face 21e of the projection and the tubular body 21, where cleaning media or lacquer cannot penetrate. This avoids visual defect. However, in the event of very pronounced radial deformation of the projection 21, the end face can be supported on the tubular body.

The embodiment according to FIG. 3e is a modification of FIG. 3d. Once again, a U-shaped projection 21 is used, but it is compressed axially with respect to the longitudinal axis of the shock absorber strut, so that the two webs 21c; 21d are in contact at least in one region and the projection is double-layered.

FIG. 3f is intended to show that, even in the region of the wings 27, it is still possible to increase the load-bearing capacity of the component. As in FIG. 3c, the version according to FIG. 3f has wings 27 formed to be at a radial distance from the tubular body 3. However, the wings have a surface of contact 41 with the tubular body, making it possible to use a further fastening weld seam 43 alternatively to or in combination with the fastening weld seam 41. Shaped radially inward at the lateral edge of the wing is a web 45 which bridges the distance between the rest of the wing and the tubular body, so that the contact surface is formed by the end face of the lateral edge.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A shock absorber strut, comprising:
a tubular body arranged at a lower region of the strut;
a steering knuckle;
means for clamping the steering knuckle to the tubular body, the clamping means comprising a continous slot in the steering knuckle in a longitudinal direction of the tubular body and fastening means for fastening the steering knuckle to the tubular body; and
means for positioning the tubular body with respect to the clamping means, the positioning means being a one piece component comprising a stop for positioning in the longitudinal direction and a projection for positioning in a circumferential direction, the stop comprisese a middle part fastened to the tubular body and a least one lateral wing extending from the middle part, the wing being a predetermined radial distance from the tubular body.

2. The shock absorber strut according to claim 1, wherein the projection is tongue shaped projecting from a plane of the middle part.

3. The shock absorber strut according to claim 2, wherein the projection has a substantially S-shaped profile.

4. The shock absorber strut according to claim 2, wherein the projection has a substantially U-shaped profile.

5. The shock absorber strut according to claim 2, wherein the projection has a substantially compressed U-shaped profile forming a double layer essentially perpendicular to the longitudinal direction.

6. The shock absorber strut according to claim 4, wherein the projection further comprises a projection end face at a predetermined distance from the tubular body that faces the tubular body.

7. The shock absorber strut according to claim 5, wherein the projection further comprises a projection end face at a predetermined distance from the tubular body that faces the tubular body.

8. The shock absorber strut according to claim 1, wherein the middle part is connected by contact welding to the tubular body for positioning the clamping connection with respect to the tubular body.

9. The shock absorber strut according to claim 8, wherein the middle part is further connected to the tubular body by fastening welding.

10. The shock absorber strut according to claim 1, wherein the stop comprises a middle part fastened to the tubular body, and the middle part forms a positive connection with the tubular body.

11. The shock absorber strut according to claim 10, wherein the middle part comprises a bead and the tubular body comprises a depression into which the bead engages, the bead and the depression together forming the positive connection.

12. The shock absorber strut according to claim 1, wherein at least one lateral wing is welded to the tubular body.

13. The shock absorber strut according to claim 12, wherein the lateral wing has a contact surface which contacts the tubular body.

14. The shock absorber strut according to claim 13, wherein the contact surface comprises a lateral edge of the lateral wing.

15. The shock absorber strut according to claim 14, wherein the contact surface comprises an end face of the lateral edge.

* * * * *